US012496682B2

(12) United States Patent
Gerdes et al.

(10) Patent No.: US 12,496,682 B2
(45) Date of Patent: Dec. 16, 2025

(54) DIE GRINDER WITH AN OFFSET GEAR TRANSMISSION

(71) Applicant: TECHTRONIC CORDLESS GP, Anderson, SC (US)

(72) Inventors: Garrett C. Gerdes, Greenville, SC (US); Curt Austin Laugh, Anderson, SC (US); Elton Lee Watson, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/363,361

(22) Filed: Aug. 1, 2023

(65) Prior Publication Data

US 2024/0051084 A1 Feb. 15, 2024

Related U.S. Application Data

(60) Provisional application No. 63/371,468, filed on Aug. 15, 2022.

(51) Int. Cl.
*B24B 47/12* (2006.01)
*B25F 5/00* (2006.01)

(52) U.S. Cl.
CPC .............. *B24B 47/12* (2013.01); *B25F 5/001* (2013.01)

(58) Field of Classification Search
CPC ............. B25F 5/00; B25F 5/001; B24B 47/12
See application file for complete search history.

(56) References Cited

U.S. PATENT DOCUMENTS

| | | | |
|---|---|---|---|
| 3,178,956 | A | 4/1965 | Stanley |
| 3,710,154 | A | 1/1973 | Schilling |
| 3,785,443 | A | 1/1974 | Armbruster |
| 4,597,453 | A | 7/1986 | Kilmer et al. |
| 4,823,885 | A | 4/1989 | Okumura |
| 5,343,961 | A | 9/1994 | Ichikawa |
| 5,624,000 | A | 4/1997 | Miller |
| 5,984,022 | A | 11/1999 | Harman, Jr. et al. |
| 6,273,200 | B1 | 8/2001 | Smith et al. |
| 6,305,481 | B1 | 10/2001 | Yamazaki et al. |
| 6,431,289 | B1 | 8/2002 | Potter et al. |
| 6,705,410 | B2 | 3/2004 | Ziegler |
| 6,715,380 | B2 | 4/2004 | Listl et al. |
| 6,793,023 | B2 | 9/2004 | Holzer et al. |
| 6,796,921 | B1 | 9/2004 | Buck et al. |
| 6,814,158 | B2 | 11/2004 | Bieber et al. |
| 6,983,810 | B2 | 1/2006 | Hara et al. |
| 7,121,361 | B2 | 10/2006 | Hara et al. |

(Continued)

FOREIGN PATENT DOCUMENTS

| | | | |
|---|---|---|---|
| CN | 103659701 | A | 3/2014 |
| CN | 104117711 | A | 10/2014 |

(Continued)

*Primary Examiner* — Daniel Jeremy Leeds
(74) *Attorney, Agent, or Firm* — Michael Best & Friedrich LLP

(57) ABSTRACT

A tool includes a housing, a motor within the housing, a gear box operably coupled to the motor, the gear box including an input shaft that rotates about an input drive axis and an output shaft that rotates about an output drive axis, wherein the output drive axis is aligned with the input drive axis along a drive plane and offset from the input drive axis within the drive plane.

17 Claims, 20 Drawing Sheets

(56) References Cited

U.S. PATENT DOCUMENTS

| | | | |
|---|---|---|---|
| 7,334,646 | B2 | 2/2008 | Hara et al. |
| 7,395,876 | B1 | 7/2008 | Walker |
| 7,427,722 | B2 | 9/2008 | Wu |
| 7,591,324 | B2 | 9/2009 | Saur |
| 7,900,715 | B2 | 3/2011 | Chen |
| 8,057,134 | B2 | 11/2011 | Mok et al. |
| 8,075,229 | B2 | 12/2011 | Mok et al. |
| 8,096,857 | B2 | 1/2012 | Hofmann et al. |
| 8,485,275 | B2 | 7/2013 | Kuroyanagi et al. |
| 8,714,566 | B2 | 5/2014 | Campbell et al. |
| 8,727,941 | B2 | 5/2014 | Aoki |
| 9,016,398 | B2 | 4/2015 | Steckel et al. |
| 9,346,154 | B2 | 5/2016 | Roehm |
| 9,550,283 | B2 | 1/2017 | Johnson |
| 9,687,947 | B2 | 6/2017 | Roehm et al. |
| 9,751,176 | B2 | 9/2017 | Mcroberts et al. |
| 9,878,435 | B2 | 1/2018 | Ito |
| 10,213,852 | B2 | 2/2019 | Qian et al. |
| 10,220,493 | B2 | 3/2019 | Seith et al. |
| 10,226,826 | B2 | 3/2019 | Kehoe et al. |
| 10,299,804 | B2 | 5/2019 | Aman et al. |
| 10,486,296 | B2 | 11/2019 | Ito |
| 10,576,593 | B2 | 3/2020 | McRoberts et al. |
| 10,624,651 | B2 | 4/2020 | Aman et al. |
| 10,821,530 | B2 | 11/2020 | Qian et al. |
| 10,974,381 | B2 | 4/2021 | Schadow et al. |
| 11,241,746 | B2 | 2/2022 | Tesar |
| 11,260,509 | B2 | 3/2022 | Hsu et al. |
| 11,260,515 | B2 | 3/2022 | Ito |
| 2006/0213675 | A1 | 9/2006 | Whitmire et al. |
| 2007/0068693 | A1 | 3/2007 | Whitmire et al. |
| 2007/0084614 | A1 | 4/2007 | Whitmire et al. |
| 2008/0271906 | A1 | 11/2008 | Walker |
| 2009/0126960 | A1 | 5/2009 | Radif |
| 2009/0308626 | A1 | 12/2009 | Saur |
| 2012/0198708 | A1 | 8/2012 | Naito et al. |
| 2016/0236317 | A1* | 8/2016 | Inkster .................... F16H 1/20 |
| 2017/0326712 | A1 | 11/2017 | Li et al. |
| 2018/0290284 | A1 | 10/2018 | Johansson |
| 2019/0118362 | A1 | 4/2019 | Greunke et al. |
| 2019/0126418 | A1 | 5/2019 | Bendell |
| 2019/0151967 | A1 | 5/2019 | Kehoe et al. |
| 2019/0193255 | A1* | 6/2019 | Valentini .............. H02K 49/102 |
| 2019/0283202 | A1* | 9/2019 | Nybacka ................ B24B 23/04 |
| 2019/0358801 | A1 | 11/2019 | Mccue et al. |
| 2020/0156232 | A1 | 5/2020 | Huang |
| 2020/0215678 | A1 | 7/2020 | Nakashima |
| 2020/0331137 | A1 | 10/2020 | Huang |
| 2021/0237306 | A1 | 8/2021 | Sigafoose et al. |
| 2021/0268637 | A1 | 9/2021 | Goto |
| 2022/0088762 | A1 | 3/2022 | Nakane et al. |
| 2022/0134527 | A1 | 5/2022 | Ito |

FOREIGN PATENT DOCUMENTS

| | | | |
|---|---|---|---|
| CN | 104985572 | A | 10/2015 |
| CN | 104999410 | A | 10/2015 |
| CN | 205074571 | U | 3/2016 |
| CN | 107139140 | A | 9/2017 |
| CN | 107283368 | A | 10/2017 |
| CN | 108071757 | A | 5/2018 |
| CN | 207830479 | U | 9/2018 |
| CN | 208132044 | U | 11/2018 |
| CN | 209175687 | U | 7/2019 |
| CN | 209773604 | U | 12/2019 |
| CN | 110666750 | A | 1/2020 |
| CN | 111365434 | A | 7/2020 |
| CN | 212385362 | U | 1/2021 |
| CN | 112847257 | A | 5/2021 |
| CN | 113231993 | A | 8/2021 |
| CN | 113814941 | A | 12/2021 |
| DE | 102008064511 | B4 | 7/2011 |
| EP | 199883 | A2 | 11/1986 |
| EP | 1652631 | A1 | 5/2006 |
| EP | 2033743 | A2 | 3/2009 |
| EP | 2286961 | A2 | 2/2011 |
| GB | 2322675 | A | 9/1998 |
| WO | 2005093290 | A1 | 10/2005 |
| WO | 2008099744 | A1 | 8/2008 |
| WO | 2008116412 | A1 | 10/2008 |
| WO | 2012010093 | A1 | 1/2012 |
| WO | 2017107492 | A1 | 6/2017 |
| WO | 2018062609 | A1 | 4/2018 |

* cited by examiner

DIE GRINDER WITH AN OFFSET GEAR TRANSMISSION

CROSS-REFERENCE TO RELATED APPLICATIONS

This application claims priority to U.S. Provisional Patent Application No. 63/371,468 filed on Aug. 15, 2022 the entire content of which is incorporated herein by reference.

FIELD OF THE DISCLOSURE

The present disclosure relates to power tools, and more specifically to die grinders.

BACKGROUND OF THE DISCLOSURE

Die grinders are handheld power tools that removably engage an abrasive mounted on a post. The die grinder rotates the abrasive to remove material from a workpiece while the abrasive is in contact with the workpiece.

SUMMARY OF THE DISCLOSURE

In a first embodiment the present disclosure provides, a tool that includes a housing, a motor within the housing, a gear box operably coupled to the motor, the gear box including an input shaft that rotates about an input drive axis and an output shaft that rotates about an output drive axis, wherein the output drive axis is aligned with the input drive axis along a drive plane and offset from the input drive axis within the drive plane.

In another embodiment, the present disclosure provides a tool that includes a housing, a motor within the housing, a gear box operably coupled to the motor, the gear box including an offset gear assembly having an input gear having an outer periphery and an output gear having an inner periphery, wherein a center of the input gear is spaced an offset distance D from a center of the input gear and the outer periphery of the input gear is meshed with the inner periphery of the output gear.

In still another embodiment, the present disclosure provides a tool that includes a housing, a motor within the housing, a gear box operably coupled to the motor, the gear box including and offset gear assembly that includes an input shaft having an input gear disposed thereon, wherein the input gear rotates with the input shaft, and an output shaft having an output gear disposed thereon, wherein the output gear rotates with the output shaft, and wherein the output gear circumferentially surrounds the input gear and the output gear at least partially overlaps the input gear along a longitudinal axis such that the input gear is nested within the output gear and is meshed with the output gear.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
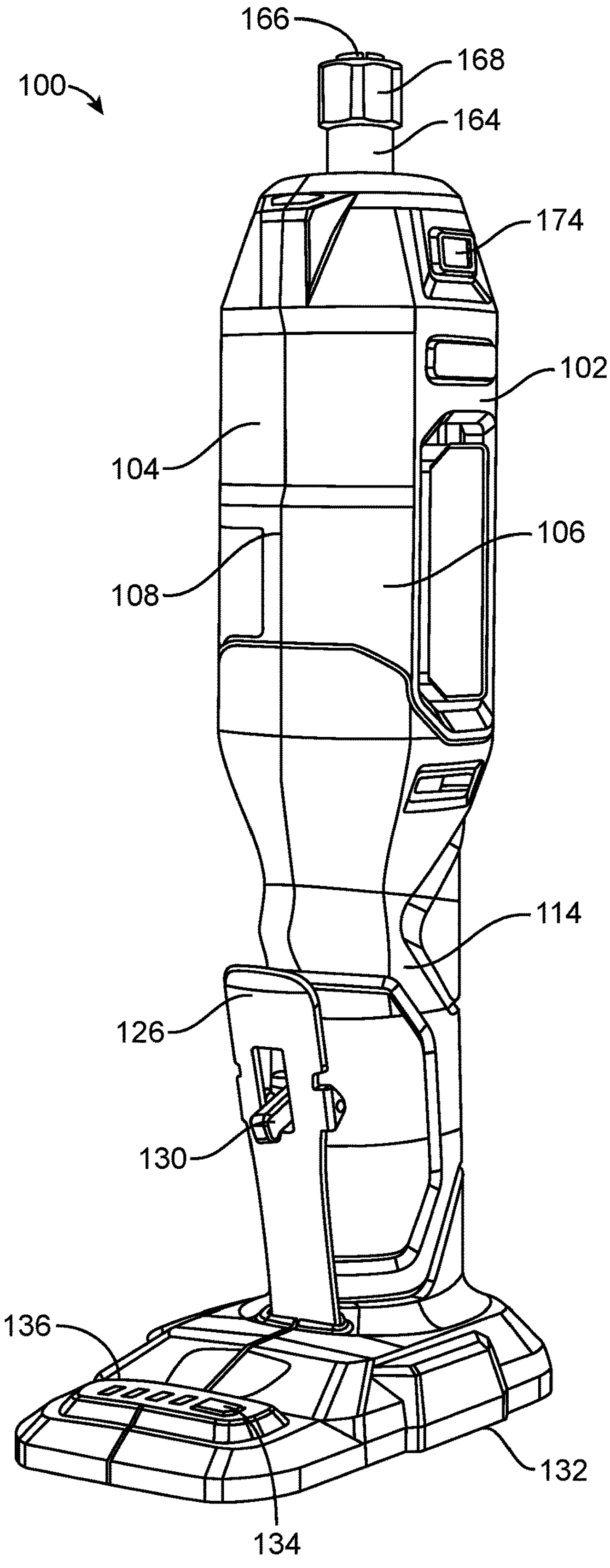
FIG. 1 is a perspective view of a die grinder according to one embodiment.
Figure 2:
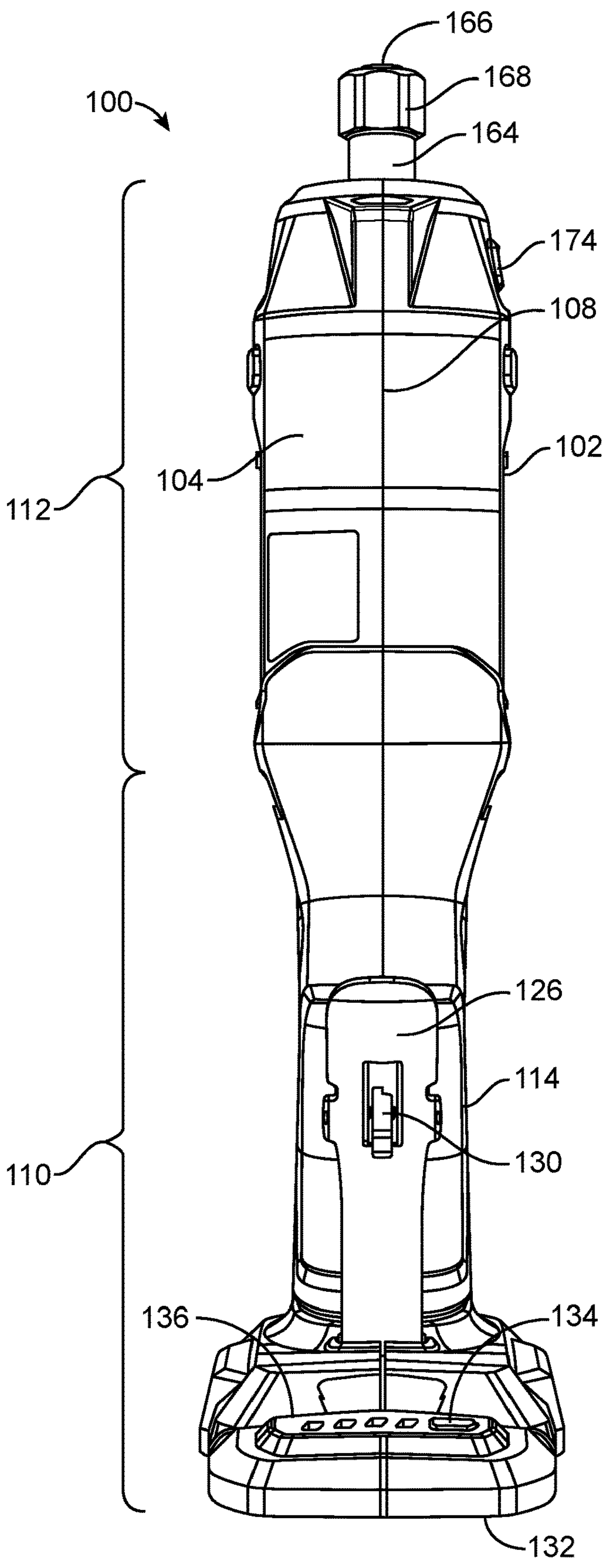
FIG. 2 is a bottom view of the die grinder of FIG. 1.

FIGS. 1-4 illustrates an exemplary power tool 100 that takes the form of a rotary die grinder 100 that is battery-powered. The power tool 100 may takes other forms and, while the power tool will be described in detail relative to a rotary die grinder, it will be appreciated that the invention described herein may apply to other power tools. As illustrated in FIGS. 1 and 2, the rotary die grinder 100 includes a housing 102 that has a first housing side 104 and a second housing side 106. As shown, the housing sides 104, 106 meet to form an interface 108 between the housing sides 104, 106. It is to be understood that the housing sides 104, 106 are cooperating clamshell halves that are attached, or otherwise affixed, to each other via a plurality of fasteners (e.g., screws), via an adhesive, or a plastic welding operation.

Figure 3:
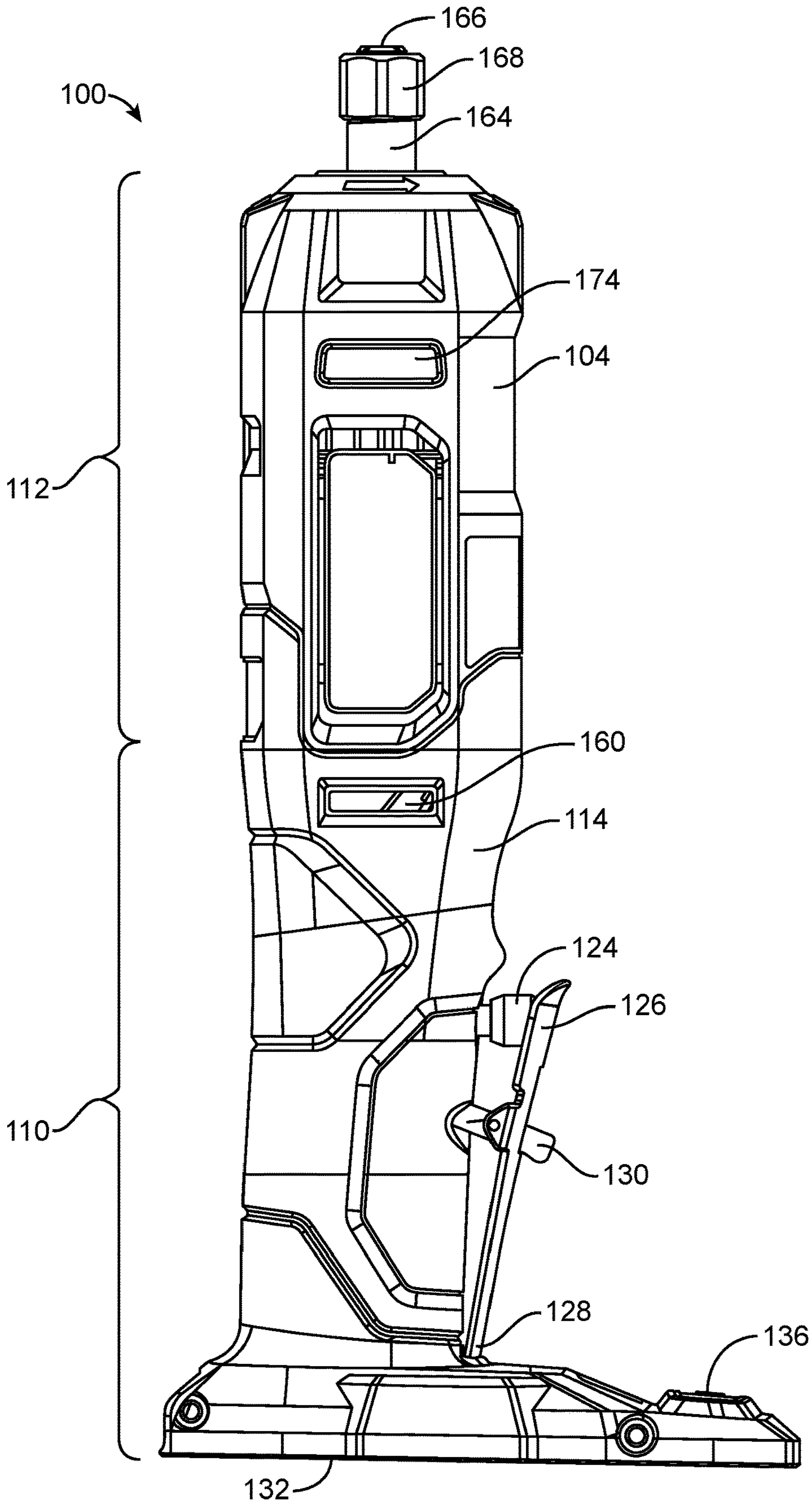
FIG. 3 is a side view of the die grinder of FIG. 1.
Figure 4:
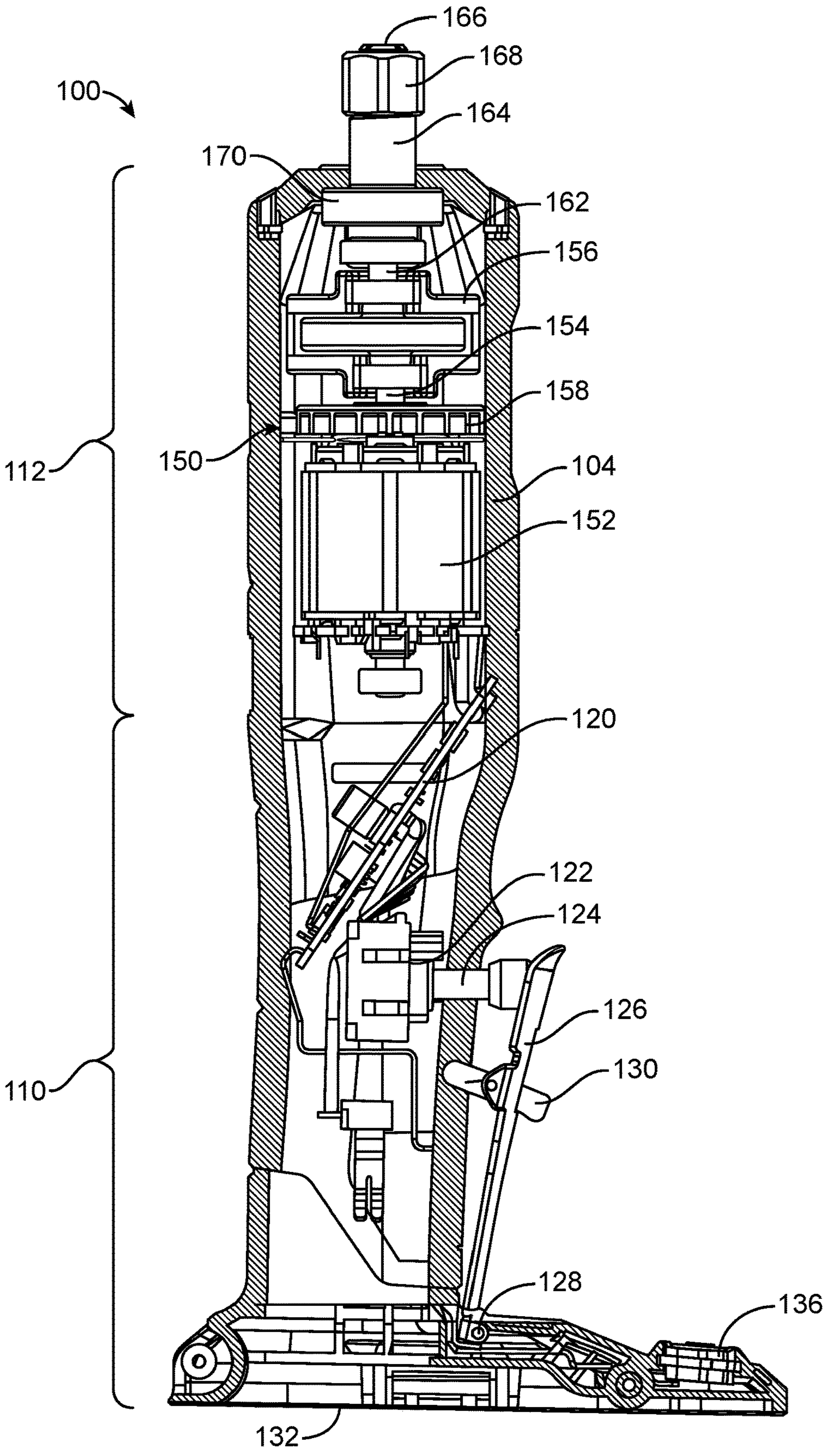
FIG. 4 is a side view of the die grinder of FIG. 1 with a portion of the housing removed.
Figure 5:
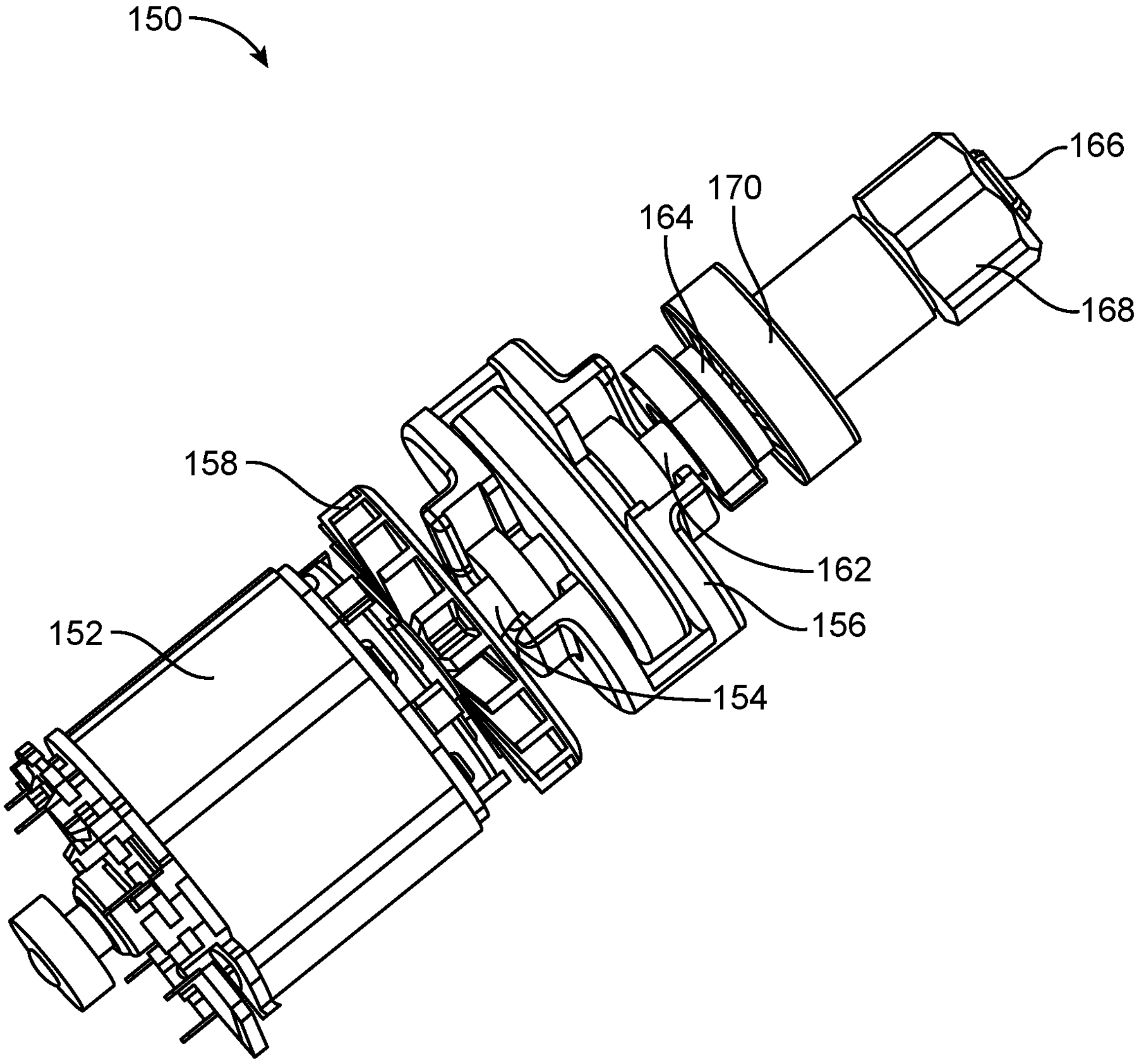
FIG. 5 is a perspective view of a drive assembly for the die grinder of FIG. 1.
Figure 6:
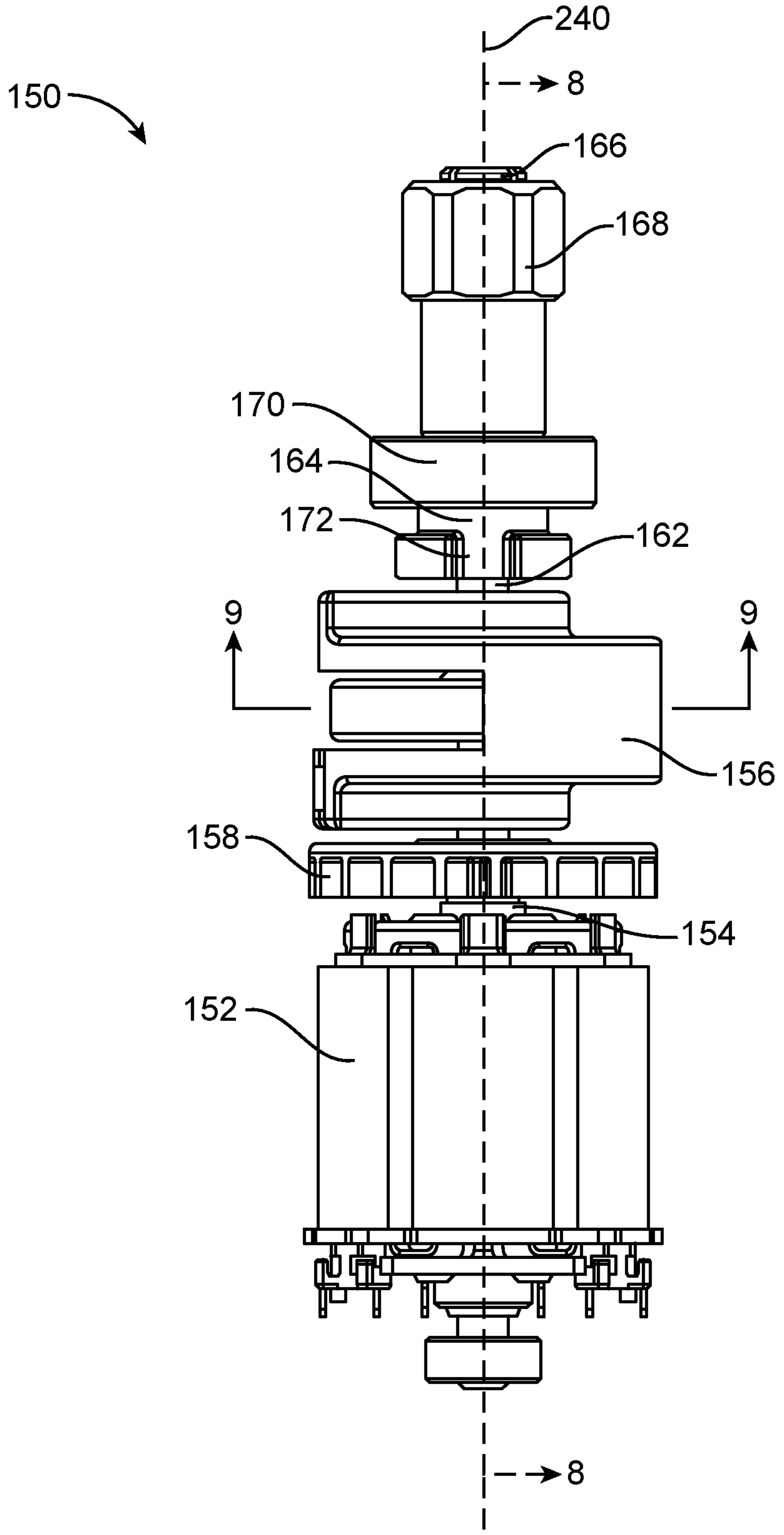
FIG. 6 is a top view of the drive assembly of FIG. 5.
Figure 7:
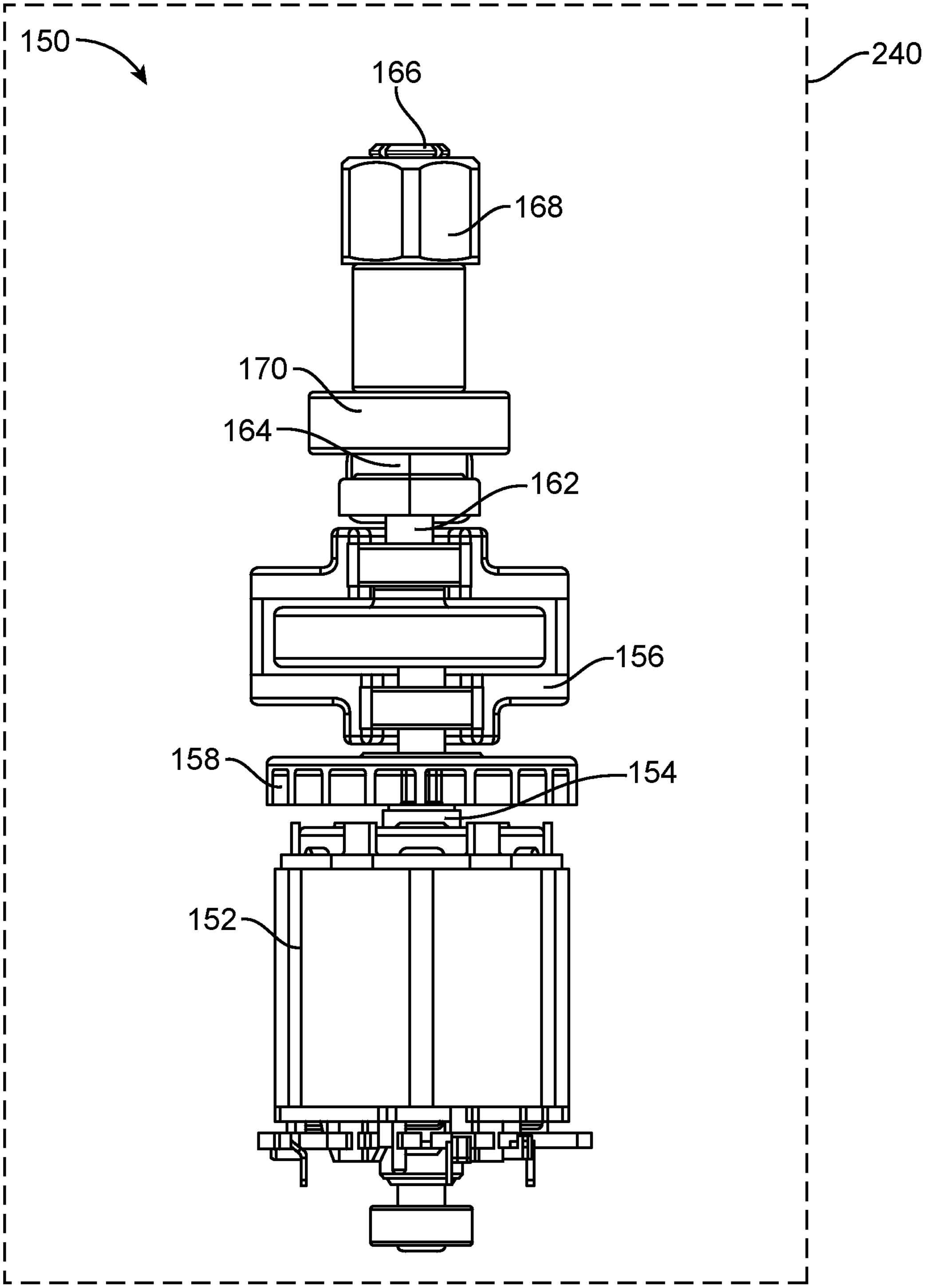
FIG. 7 is a side view of the drive assembly of FIG. 5 (which is rotated 90° around a central, longitudinal axis from FIG. 6).

As depicted in FIG. 2-4, the housing 102 is hollow and includes a handle portion 110 and a drive portion 112 aligned therewith. When the die grinder 100 is assembled as indicated in FIGS. 1-3, the handle portion 110 forms a grip 114 that a user grasps while operating the die grinder 100. The die grinder 100 includes a circuit board 120 disposed within the handle portion 110. The circuit board 120 can be a printed circuit board (PCB) or a flexible circuit board and includes the electronics for controlling the operation of the die grinder 100. As shown, the die grinder 100 further includes a depressible trigger assembly 122 within the handle portion 110. The trigger assembly 122 is operably coupled to the circuit board 120. The trigger assembly 122 includes a depressible plunger 124 that extends outwardly from the handle portion 110. The die grinder 100 includes a paddle trigger 126 that rotates about a pivot 128 at the end of the paddle trigger 126 and is engaged with the plunger 124. The paddle trigger 126 includes a lever lock 130 that prevent the trigger from being accidentally pressed.

As further shown in FIGS. 1-4, the handle portion 110 includes a battery receptacle 132 that is configured to removably engage a direct current (DC) battery pack. When engaged with the battery receptacle 132, the battery pack is electrically operably coupled with the circuit board 120. The die grinder 100 also includes a mode selector button 134 and a series of mode indicator lights 136.

FIG. 4 shows that the die grinder 100 includes a drive assembly 150 disposed within the drive portion 112. As further illustrated in FIGS. 4-8, the drive assembly 150 includes a motor 152 (e.g., a brushless direct current (BLDC) motor) that is operably coupled to an input shaft 154 of a gear box 156. When a battery pack is installed within the battery receptacle 132, the motor 152 receives power from the battery pack as the user selectively actuates the trigger assembly 122 by depressing the paddle trigger 126, which presses plunger 124. A fan 158 is installed on the input shaft 154 between the motor 152 and the gear box 156 and rotates with the input shaft 154. The fan 158 rotates to draw air into the housing 102 via one or more vent openings 160 (FIG. 3) that are formed in the housing 102 to cause airflow around the motor 152 that dissipates heat from the motor 152.

The gear box 156 includes an output shaft 162 that is operably coupled to a drive shaft 164. The drive shaft 164 rotates with the output shaft 162 and includes a tool engagement arbor 166 that is configured to receive a tool bit (not shown) such as a grinding tool mounted on a post. The arbor 166 is circumscribed by a lock nut 168 and as the lock nut is turned clockwise, the arbor 166 collapses radially to provide a radial clamping force on the post of the tool bit. It is to be understood that rotating the lock nut 168 counterclockwise causes the arbor 166 to expand radially and release the clamping force on the post of the tool bit. The drive shaft 164 is supported by a bearing 170 at the working end of the die grinder 100. The drive shaft 164 further includes a locking notch 172 into which a lock button 174 (FIG. 1) fits radially to lock the drive shaft 164 while installing or removing a tool bit from the arbor 166.

Figure 8:
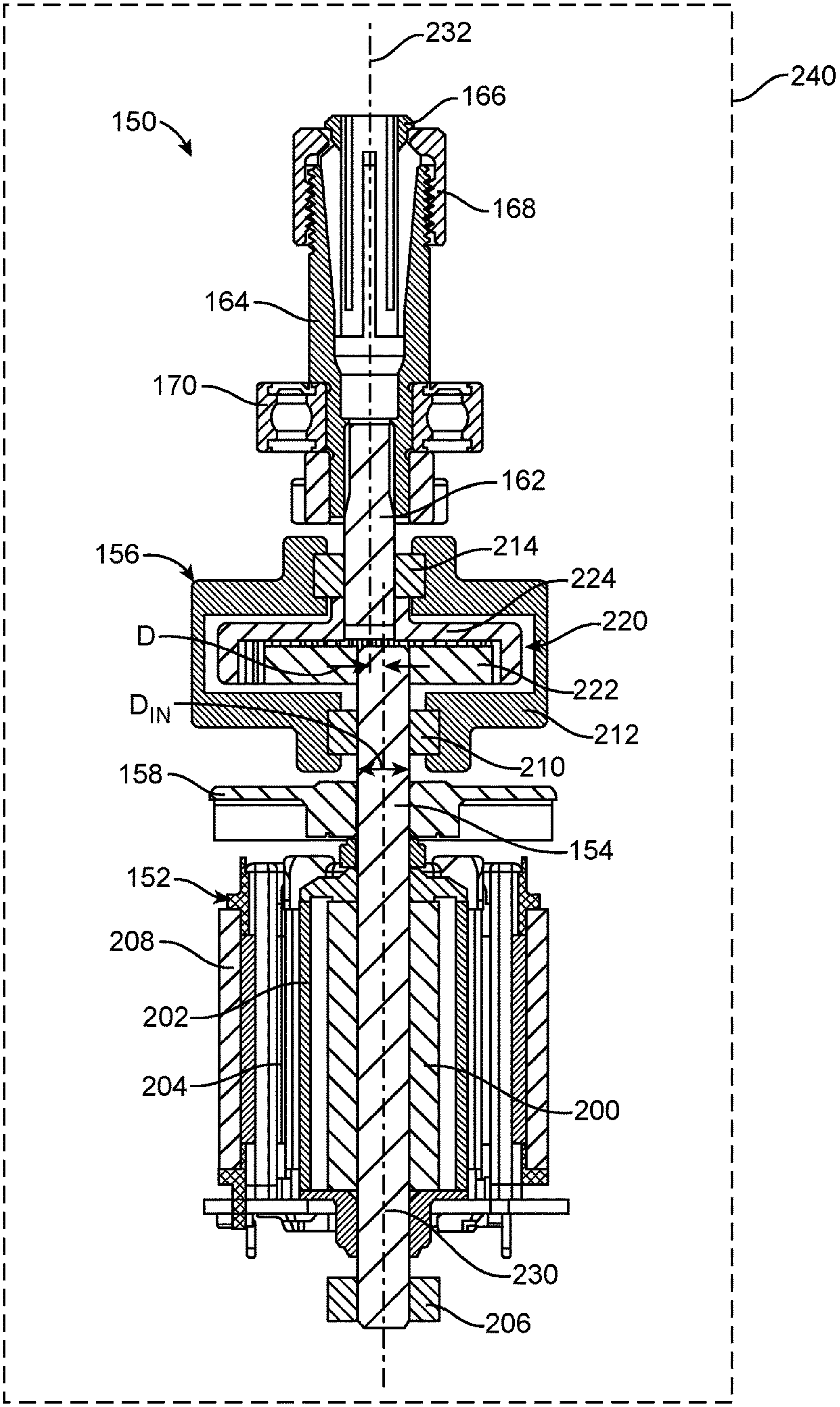
FIG. 8 is a cross-section view of the drive assembly of FIG. 5 taken along line 8-8 in FIG. 6 (which also a cross-section view of FIG. 7).

FIG. 8 illustrates the internal components of the drive assembly 150. As shown, the motor 152 includes a rotor 200 that is surrounded by a stator 202 with a coil 204. The coil 204 is selectively energized as a user depresses the paddle trigger 126 to actuate the trigger assembly 122 via the plunger 124. As the coil 204 is energized, the rotor 200 rotates. The rotor 200 of the motor 152 is disposed on the input shaft 154 of the gear box 156 and rotates therewith. The input shaft 154 of the gear box 156 is supported by a first input shaft bearing 206 adjacent the motor housing 208 and a second input shaft bearing 210 installed within the gear box housing 212. The output shaft 162 of the gear box 156 is supported by an output shaft bearing 214 within the gear box housing 212 opposite the second input shaft bearing 210. The output shaft 162 is rotationally supported by the bearing 170.

As shown, the gear box 156 includes an offset gear assembly 220 that has an input gear 222 disposed on the input shaft 154 and an output gear 224. The input gear 222 rotates with the input shaft 154. The output gear 224 circumferentially surrounds the input gear 222 and at least partially overlaps the input gear 222 along a longitudinal axis. As shown, the input gear 222 is nested within and meshed with the output gear 224. As the input gear 222 rotates clockwise, the output gear 224 also rotates clockwise. Further, as the input gear 222 rotates counterclockwise, the output gear 224 also rotates counterclockwise. Accordingly, the input gear 222 and the output gear 224 rotate in the same direction.

Figure 9:
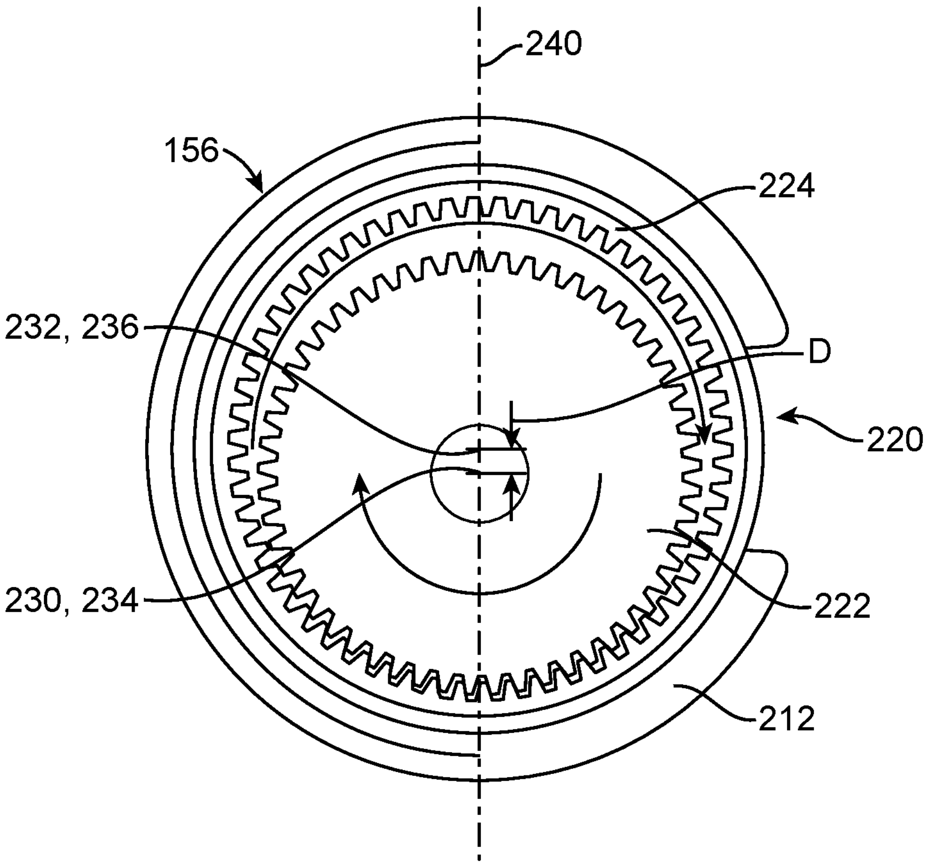
FIG. 9 is a cross-section view of the drive assembly of FIG. 5 taken along line 9-9 in FIG. 6.

As illustrated in FIGS. 8 and 9, the input shaft 154 defines an input drive axis 230 and the output shaft 162 defines an output drive axis 232. As shown in FIG. 8, the input drive axis 230 and the output drive axis 232 are offset from each other by an offset distance D. It should be understood and appreciated that the center 234 of the input gear 222 and the center 236 of the output gear 224 are separated by the offset distance D. In a particular aspect, the offset distance D is greater than or equal to 1.500 millimeters (mm) (e.g., greater than or equal to 1.525 mm, greater than or equal to 1.550 mm, greater than or equal to 1.575 mm, or greater than or equal to 1.600 mm). In another aspect, the offset distance D is less than or equal to 1.700 mm (e.g., less than or equal to 1.675 mm, less than or equal to 1.650 mm, or less than or equal to 1.625 mm). It is to be understood that the offset distance D may be within a range between, and including, any of the minimum and maximum values of the offset distance D.

In another aspect, as indicated in FIG. 8, the input shaft 154 has a diameter $D_{IN}$ and the offset distance D is greater than or equal to 0.2 times the diameter $D_{IN}$ (e.g., greater than or equal to 0.21 times the diameter $D_{IN}$, greater than or equal to 0.22 times the diameter $D_{IN}$, 0.23 times the diameter $D_{IN}$, greater than or equal to 0.24 times the diameter $D_{IN}$, or greater than or equal to 0.25 times the diameter $D_{IN}$). Further, the offset distance D is less than or equal to 0.3 times the diameter $D_{IN}$ (e.g., less than or equal to 0.29 times the diameter $D_{IN}$, less than or equal to 0.28 times the diameter $D_{IN}$, less than or equal to 0.27 times the diameter $D_{IN}$, or less than or equal to 0.26 times the diameter $D_{IN}$). It is to be understood that the offset distance D may be within a range between, and including, any of the minimum and maximum values of the offset distance D described herein.

As shown in FIG. 9, the input gear 222 includes a quantity of teeth NI. In particular, the quantity of teeth NI is greater than or equal to 48 (e.g., greater than or equal to 49, greater than or equal to 50, greater than or equal to 51, greater than or equal to 52, greater than or equal to 53). In another aspect, the quantity of teeth NI is less than or equal to 57 (e.g., less than or equal to 56, less than or equal to 55, or less than or equal to 54). It is to be understood that NI may be within a range between, and including, any of the minimum and maximum values of NI described herein.

In yet another aspect, as depicted in FIG. 9, the output gear 224 includes a quantity of teeth NO. In particular, the quantity of teeth NO is greater than or equal to 58 (e.g., as greater than or equal to 59, or greater than or equal to 60). In another aspect, the quantity of teeth NO is less than or equal to 65 (e.g., less than or equal to 64, less than or equal to 63, less than or equal to 62, or less than or equal to 61). It is to be understood that NO may within a range between, and including, any of the minimum and maximum values of NO described herein.

In still another aspect, the input gear 222 and the output gear 224 define an input-to-output gear ratio R that is less than one (1). In particular, the input-to-output gear ratio R may be less than or equal to 0.98 (e.g., less than or equal to 0.95, less than or equal to 0.92, or less than or equal to 0.898). The input-to-output gear ratio R is also greater than or equal to 0.74 (e.g., greater than or equal to 0.77, greater than or equal to 0.80, greater than or equal to 0.83, or greater than or equal to 0.86). It is to be understood that the input-to-output gear ratio R may be within a range between, and including, any of the maximum and minimum values of R described herein. For example, at the input-to-output gear ratio R of 0.898, an input speed (or motor speed) of 22,000 revolutions per minute (RPM) is reduced to an output speed of 19,756 RPM.

In another embodiment, the input gear 222 and the output gear 224 may be reversed so that the input gear 222 surrounds the output gear 224. In such a case, the input-to-output gear ratio R may be less than or equal to 1.35 (e.g., less than or equal to 1.33, less than or equal to 1.25, less than or equal to 1.20, or less than or equal to 1.16). Further, in this aspect, the input-to-output gear Ra may be greater than or equal to 1.02 (e.g., greater than or equal to 1.05, greater than or equal to 1.08, greater than or equal to 1.05, or greater than or equal to 1.12). It is to be understood that the input-to-output gear ratio R may be within a range between, and including, any of the maximum and minimum values of R described herein.

As shown in FIG. 9, the offset between the input shaft 154 and the output shaft 162, and thus between the input gear 222 and the output gear 224, allows the outer periphery of the input gear 222 to mesh with the inner periphery of the output gear 224. The input drive axis 230 of the input shaft 154 and the input gear 222 extends through the center 234 of the input gear 222. Moreover, the output drive axis 232 of the output shaft 162 and the output gear 224 extends through the center 236 of the output gear 224. As illustrated in FIG. 9, the input drive axis 230 is aligned with the output drive axis 232 within a drive plane 240 along a first axis, and the input drive axis 230 is offset from the output drive axis 232 within the drive plane 240.

Figure 10:
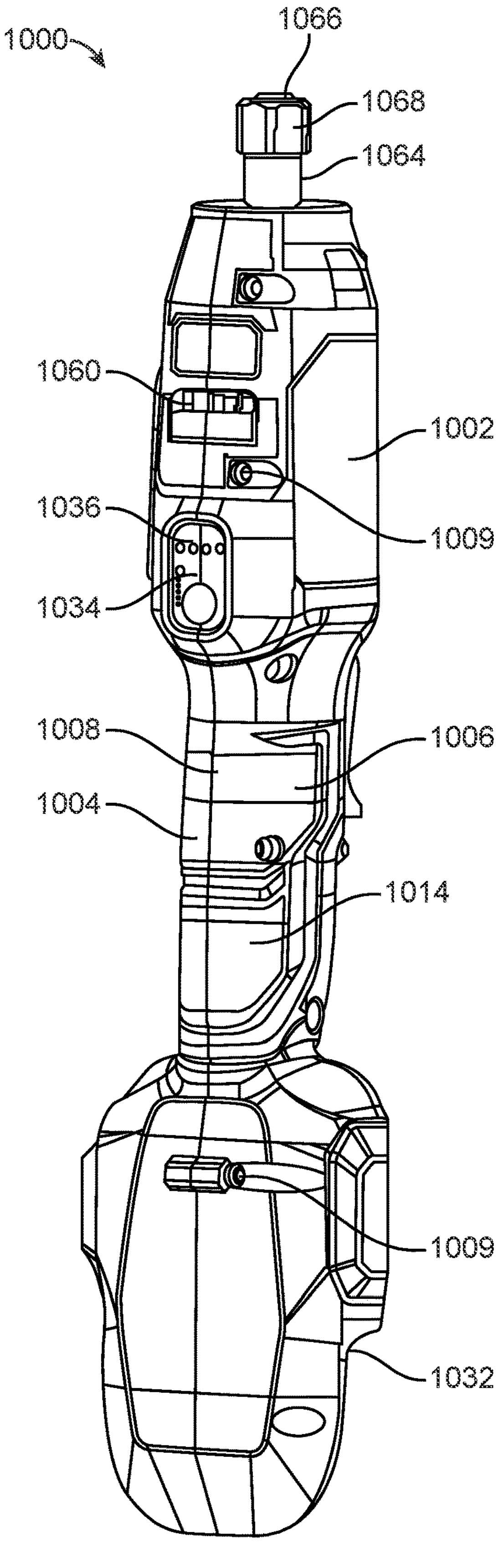
FIG. 10 is a perspective a die grinder according to another embodiment.
Figure 11:
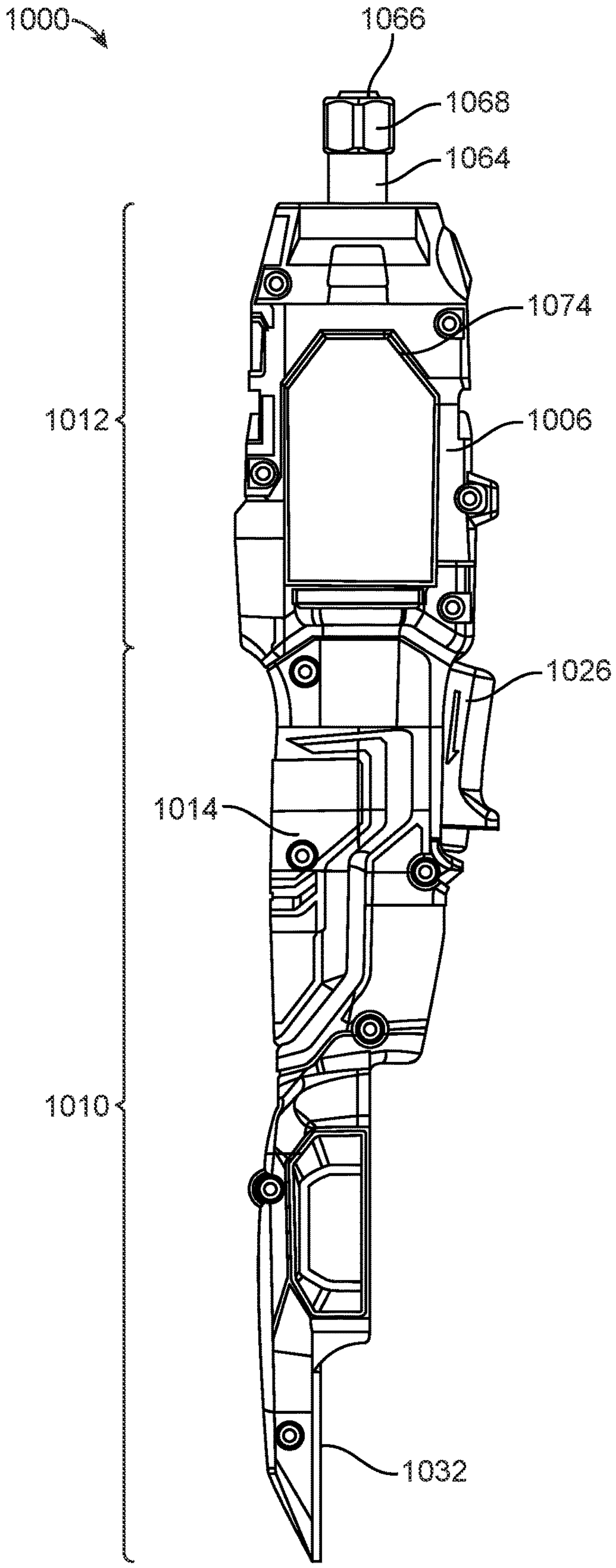
FIG. 11 is a side view of the die grinder of FIG. 10.
Figure 12:
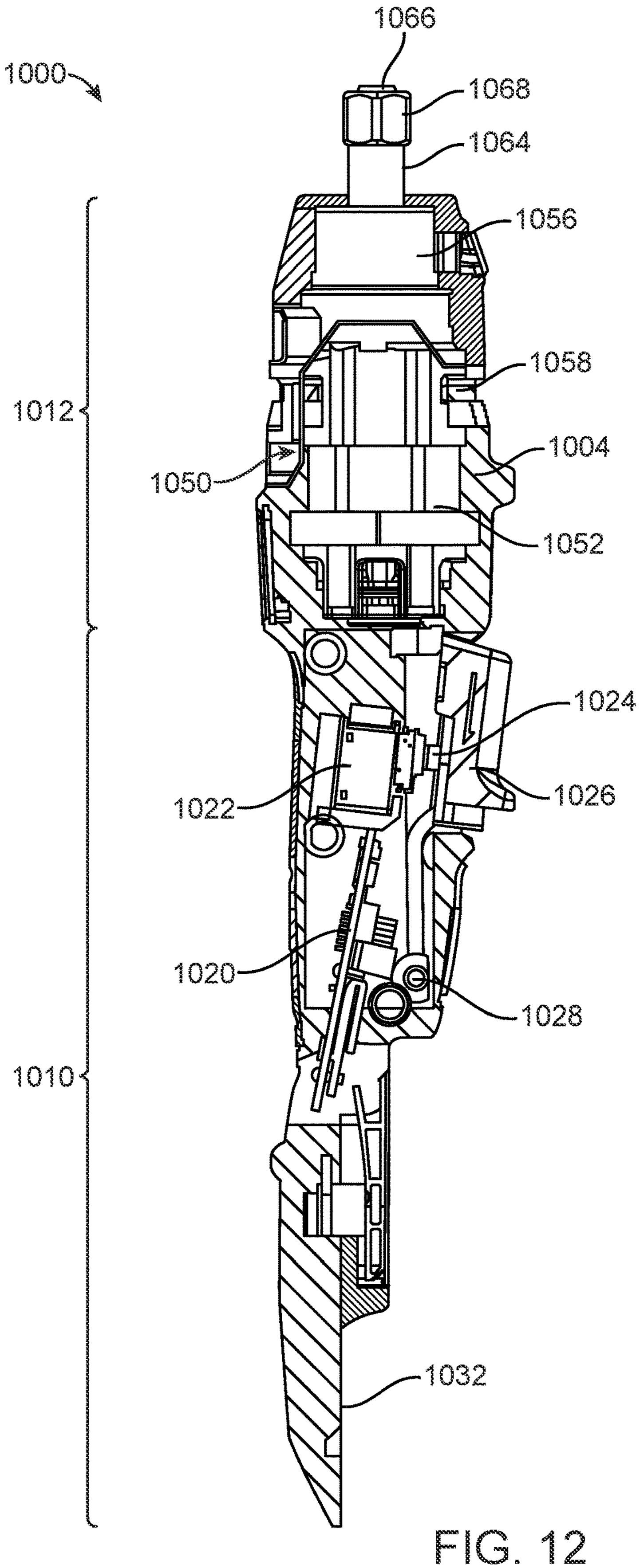
FIG. 12 is a side view of the die grinder of FIG. 10 with a portion of the housing removed.

FIGS. 10-12 illustrate another embodiment of a rotary die grinder 1000. As shown, the rotary die grinder 1000 includes a housing 1002 that has a first housing side 1004 and a second housing side 1006 that meet to form an interface 1008 between the housing sides 1004, 1006. It is to be understood that the housing sides 1004, 1006 are cooperating clamshell halves that are attached, or otherwise affixed, to each other via a plurality of fasteners 1009 (e.g., screws), an adhesive, or a plastic welding operation.

As depicted in FIG. 10-12, the housing 1002 is hollow and includes a handle portion 1010 and a drive portion 1012 aligned therewith. When the die grinder 1000 is assembled as indicated in FIGS. 10-12, the handle portion 1010 forms a grip 1014 that a user grasps while operating the die grinder 1000. The die grinder 1000 includes a circuit board 1020 disposed within the handle portion 1010. The circuit board 1020 can be a printed circuit board (PCB) or a flexible circuit board and includes the electronics for controlling the operation of the die grinder 1000. As shown, the die grinder 1000 further includes a depressible trigger assembly 1022 within the handle portion 1010. The trigger assembly 1022 is operably coupled to the circuit board 1020. The trigger assembly 1022 includes a depressible plunger 1024 that extends outwardly from the handle portion 1010. The die grinder 1000 includes a trigger 1026 that rotates about a pivot 1028 at the end of the trigger 1026 and is engaged with the plunger 1024.

With continued reference to FIGS. 10-12, the handle portion 1010 includes a battery receptacle 1032 that is configured to removably engage a direct current (DC) battery pack. The battery pack is electrically operably coupled with the circuit board 1020 when the battery pack is coupled to the battery receptacle 1032. The die grinder 1000 also includes a mode selector button 1034 and a series of mode indicator lights 1036.

Figure 13:
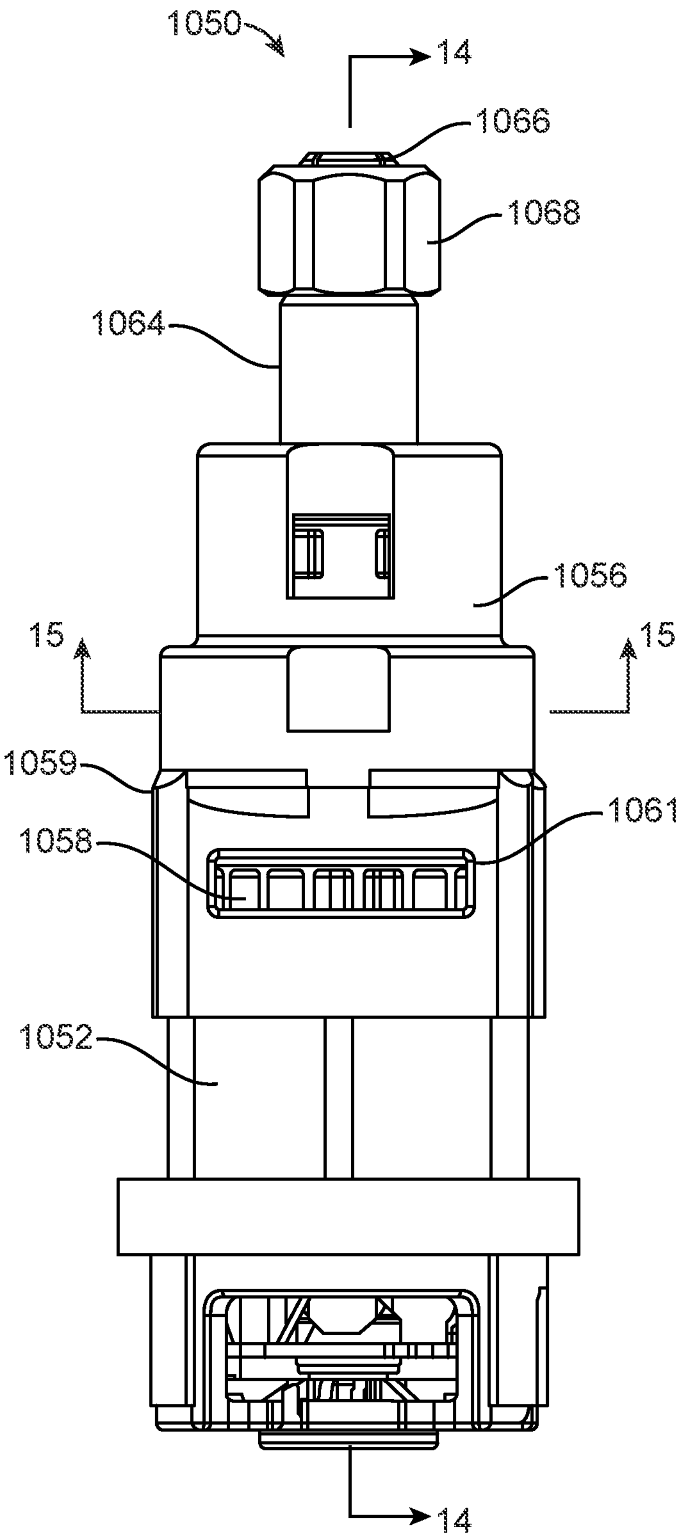
FIG. 13 is a side view of a drive assembly for the die grinder of FIG. 10.

FIG. 12 shows that the die grinder 1000 includes a drive assembly 1050 disposed within the drive portion 1012. As further illustrated in FIGS. 13-15, the drive assembly 1050 includes a motor 1052. The motor 1052 is a brushless direct current (BLDC) motor and includes an input shaft 1054 that extends into a gear box 1056. When a battery pack is installed within the battery receptacle 1032, the motor 1052 receives power from the battery pack as the user selectively actuates the trigger assembly 1022 by depressing the trigger 1026 to press the plunger 1024. A fan 1058 is installed on the input shaft 1054 between the motor 1052 and the gear box 1056 and rotates with the input shaft 1054. The fan 1058 is surrounded by a fan shroud 1059 that is extends from, or is attached to, the motor 1052. As the fan 1058 rotates it draws air into the housing 1002 via one or more vent openings 1060 (FIG. 10) formed in the housing 1002 and one or more vent openings 1061 formed in the fan shroud 1059 to cause airflow around the motor 1052 to draw heat away from the motor 1052 and cool the motor 1052.

Figure 14:
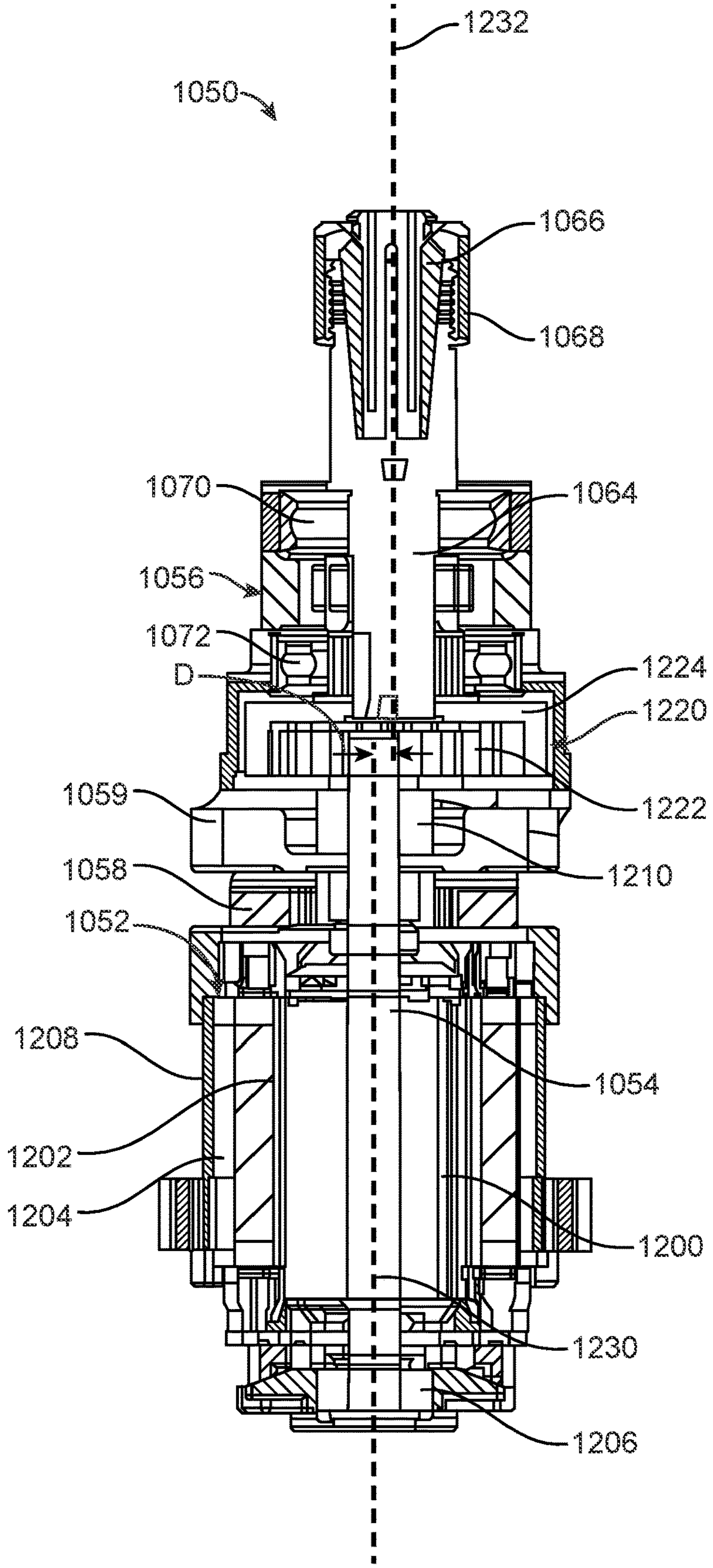
FIG. 14 is a cross-section view of the drive assembly of FIG. 13 taken along line 14-14 in FIG. 6.

As best shown in FIG. 14, the drive assembly 1050 includes an output shaft 1064. The output shaft 1064 extends from within the gear box 1056 past an end of the housing 1002. The output shaft 1064 includes a tool engagement arbor 1066 that is configured to receive a tool bit (not shown) such as a grinding tool mounted on a post. The arbor 1066 is circumscribed by a lock nut 1068 and as the lock nut is turned clockwise, the arbor 1066 collapses radially to provide a radial clamping force on the post of the tool bit. It is to be understood that rotating the lock nut 1068 counterclockwise causes the arbor 1066 to expand radially and release the clamping force on the post of the tool bit. The output shaft 1064 is supported by a first drive shaft bearing 1070 adjacent a working end of the die grinder 1000 within the gear box 1056 and by a second drive shaft bearing 1072 near a midpoint of the gear box 1056.

FIG. 14 further shows that the motor 1052 includes a rotor 1200 that is surrounded by a stator 1202 with a coil 1204. The coil 1204 is selectively energized as a user depresses the trigger 1026 to actuate the trigger assembly 1022 via the plunger 1024. As the coil 1204 is energized, the rotor 1200 rotates. The rotor 1200 of the motor 1052 is disposed on the input shaft 1054 and rotates therewith. The input shaft 1054 is supported by a first input shaft bearing 1206 adjacent a first end of the motor housing 1208 and a second input shaft bearing 1210 adjacent a second end of the motor housing 1208 within the fan shroud 1059.

As shown, the gear box 1056 includes an offset gear assembly 1220 disposed therein. The offset gear assembly 1220 includes an input gear 1222 disposed on the input shaft 1054. The input gear 1222 rotates with the input shaft 1054. The gear assembly 1220 also includes an output gear 1224 that surrounds the input gear 1222 radially and at least partially overlaps the input gear 1222 along a longitudinal axis. The output gear 1224 is coupled to the output shaft 1064 and as the output gear 1224 rotates, the output shaft 1064 also rotates.

Figure 15:
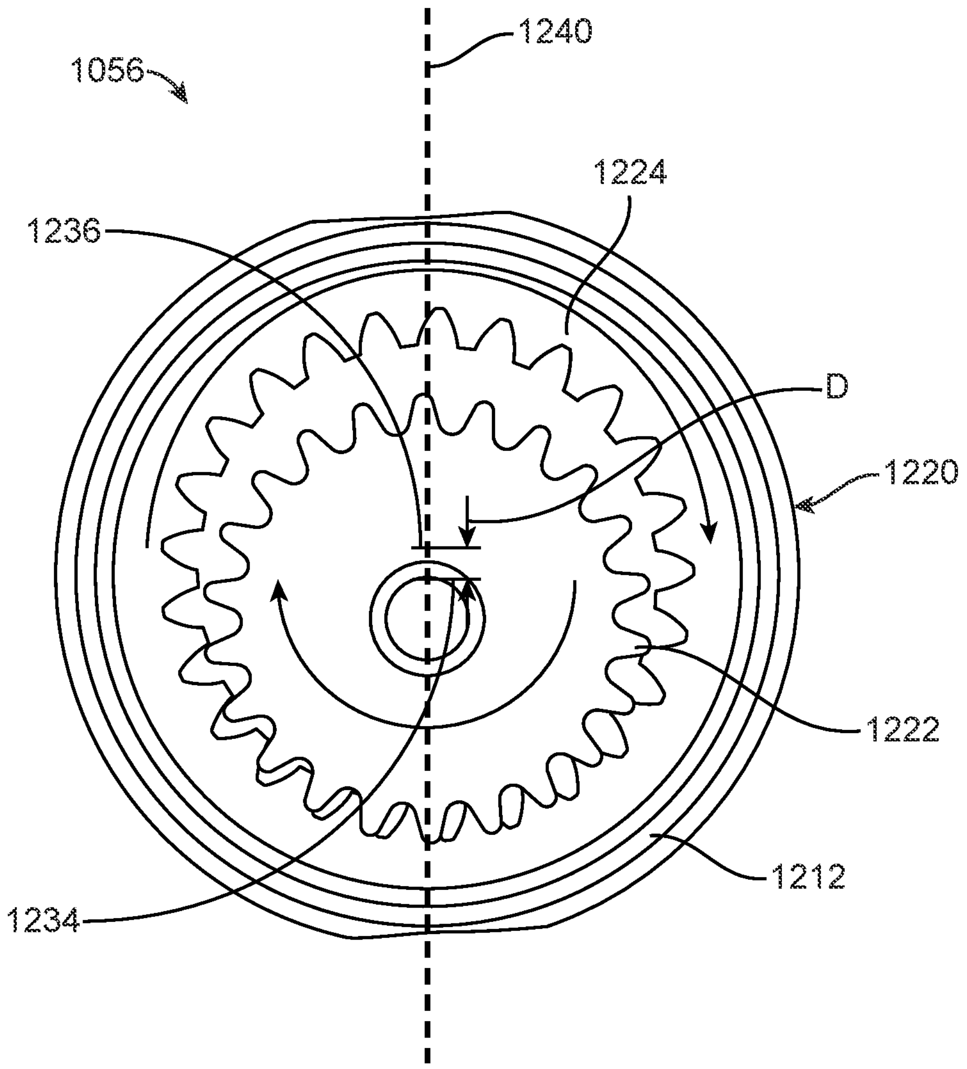
FIG. 15 is a cross-section view of the drive assembly of FIG. 13 taken along line 15-15 in FIG. 13.

As illustrated in FIGS. 14 and 15, the input shaft 1054 defines an input drive axis 1230 and the output shaft 1064 defines an output drive axis 1232. As shown in FIG. 14, the input drive axis 1230 and the output drive axis 1232 are offset from each other by an offset distance D. It is to be understood that the center 1234 of the input gear 1222 and the center 1236 of the output gear 1224 are also offset by the same offset distance D. In a particular aspect, the offset distance D is greater than or equal to 1.50 millimeters (mm) (e.g., greater than or equal to 1.75 mm, greater than or equal to 2.000 mm, greater than or equal to 2.250 mm, or greater than or equal to 2.270 mm). In another aspect, the offset distance D is less than or equal to 3.50 mm (e.g., less than or equal to 3.25 mm, less than or equal to 3.00 mm, less than or equal to 2.75 mm, or less than or equal to 2.50 mm). It is to be understood that the offset distance D may be within a range between, and including, any of the minimum and maximum values of the offset distance D.

In another aspect, the input shaft 1054 has a diameter $D_{IN}$ and the offset distance D is greater than or equal to 0.2 times the diameter $D_{IN}$ (e.g., greater than or equal to 0.21 times the diameter $D_{IN}$, greater than or equal to 0.22 times the diameter $D_{IN}$, 0.23 times the diameter $D_{IN}$, greater than or equal to 0.24 times the diameter $D_{IN}$, or greater than or equal to 0.25 times the diameter $D_{IN}$). Further, the offset distance D is less than or equal to 0.3 times the diameter $D_{IN}$ (e.g., less than or equal to 0.29 times the diameter $D_{IN}$, less than or equal to 0.28 times the diameter $D_{IN}$, less than or equal to 0.27 times the diameter $D_{IN}$, or less than or equal to 0.26 times the diameter $D_{IN}$). It is to be understood that the offset distance D may be within a range between, and including, any of the minimum and maximum values of the offset distance D described herein.

In another aspect, the input gear 1222 includes a quantity of teeth NI. For example, in the illustrated embodiment, the quantity of teeth NI is greater than or equal to 17 (e.g., greater than or equal to 15, greater than or equal to 17, greater than or equal to 20, greater than or equal to 21, greater than or equal to 22). In another aspect, the quantity of teeth NI is less than or equal to 30 (e.g., less than or equal to 25, less than or equal to 24, or less than or equal to 23). It is to be understood that the quantity of teeth NI may be within a range between, and including, any of the minimum and maximum values described herein.

In yet another aspect, the output gear 1224 includes a quantity of teeth NO. In the illustrated embodiment, the quantity of teeth NO is greater than or equal to 20 (e.g., greater than or equal to 22, or greater than or equal to 25). In another aspect, the quantity of teeth NO is less than or equal to 35 (e.g., less than or equal to 32, less than or equal to 30, less than or equal to 28, or less than or equal to 26). It is to be understood that the quantity of teeth NO may within a range between, and including, any of the minimum and maximum values described herein.

The input gear 1222 and the output gear 1224 define an input-to-output gear ratio R that is less than one (1). In particular, the input-to-output gear ratio R is less than or equal to 0.98 (e.g., less than or equal to 0.95, less than or equal to 0.92, or less than or equal to 0.88). Further, the input-to-output gear ratio R is greater than or equal to 0.72 (e.g., greater than or equal to 0.74, greater than or equal to 0.77, greater than or equal to 0.80, greater than or equal to 0.83, or greater than or equal to 0.86). It is to be understood that the input-to-output gear ratio R may be within a range between, and including, any of the maximum and minimum values of R described herein. For example, at the input-to-output gear ratio R of 0.88, an input speed (or motor speed) of 25,000 revolutions per minute (RPM) is reduced to an output speed of 22,000 RPM.

In another embodiment, the input gear 1222 and the output gear 1224 may be reversed so that the input gear 1222 surrounds the output gear 1224. In such a case, the input-to-put gear ratio R may be less than or equal to 1.39 (e.g., less than or equal to 1.35, less than or equal to 1.33, less than or equal to 1.25, less than or equal to 1.20, or less than or equal to 1.16). Further, in this aspect, the input-to-output gear Ra may be greater than or equal to 1.02 (e.g., greater than or equal to 1.05, greater than or equal to 1.08, greater than or equal to 1.05, or greater than or equal to 1.14). It is to be understood that the input-to-output gear ratio R may be within a range between, and including, any of the maximum and minimum values of R described herein.

As shown in FIG. 15, the offset between the input shaft 1054 and the output shaft 1062 and thus, the input gear 1222 and the output gear 1224, allows the outer periphery of the input gear 1222 to mesh with the inner periphery of the output gear 1224. As shown in FIG. 15, the input drive axis 1230 of the input shaft 1054 and the input gear 1222 extends through the center 1234 of the input gear 1222. Moreover, the output drive axis 1232 of the output shaft 1062 and the output gear 1224 extends through the center 1236 of the output gear 1224. As illustrated in FIG. 15, the input drive axis 1230 is aligned with the output drive axis 1232 within a drive plane 1240 along a first axis. However, the input drive axis 1230 is offset from the output drive axis 1232 within the drive plane 1240. It is to be understood that in another aspect, the drive assembly 1050 may be replaced with the drive assembly 150 of the die grinder 100 depicted in FIGS. 1-9.

Figure 16:
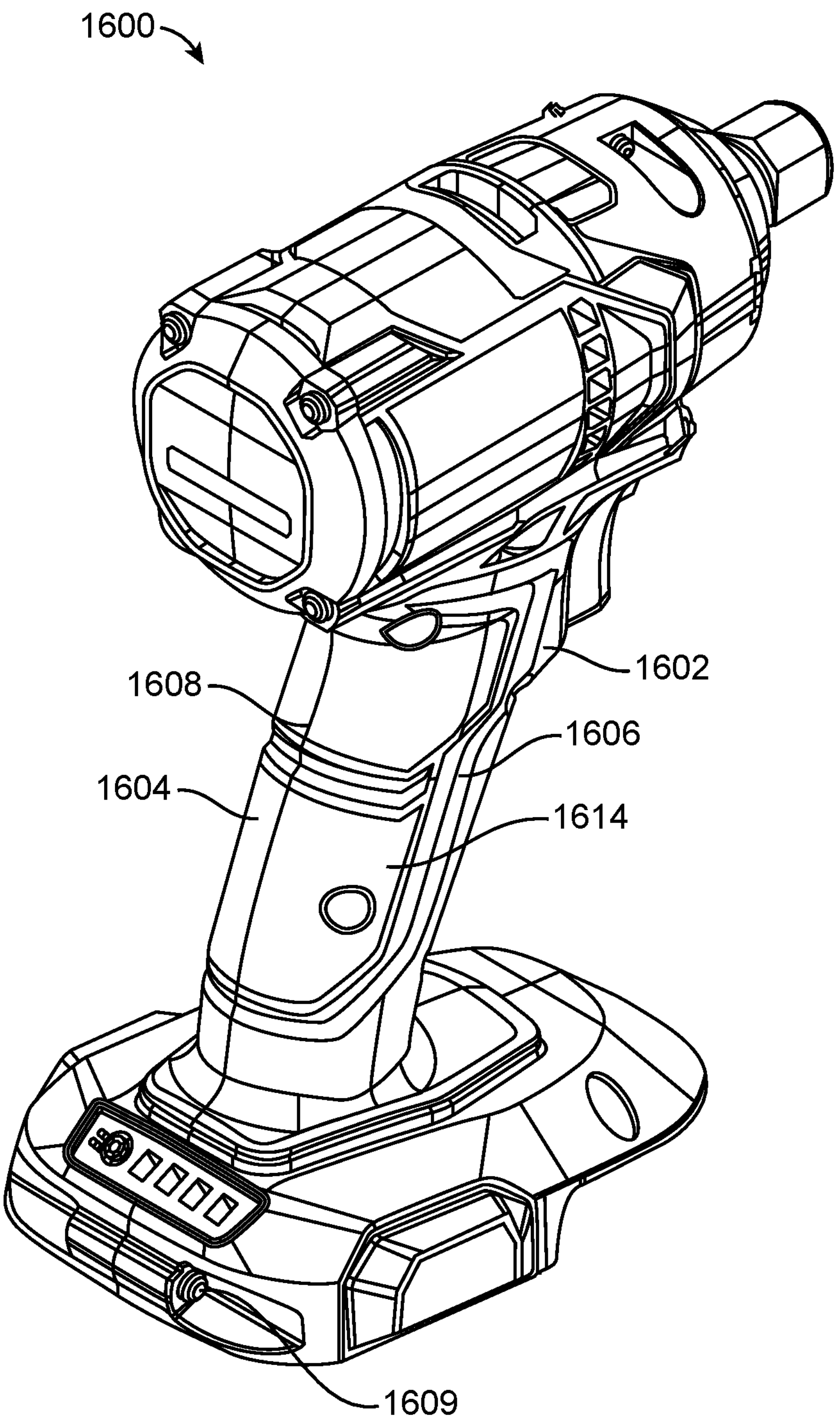
FIG. 16 is a perspective a die grinder according to yet another embodiment.
Figure 17:
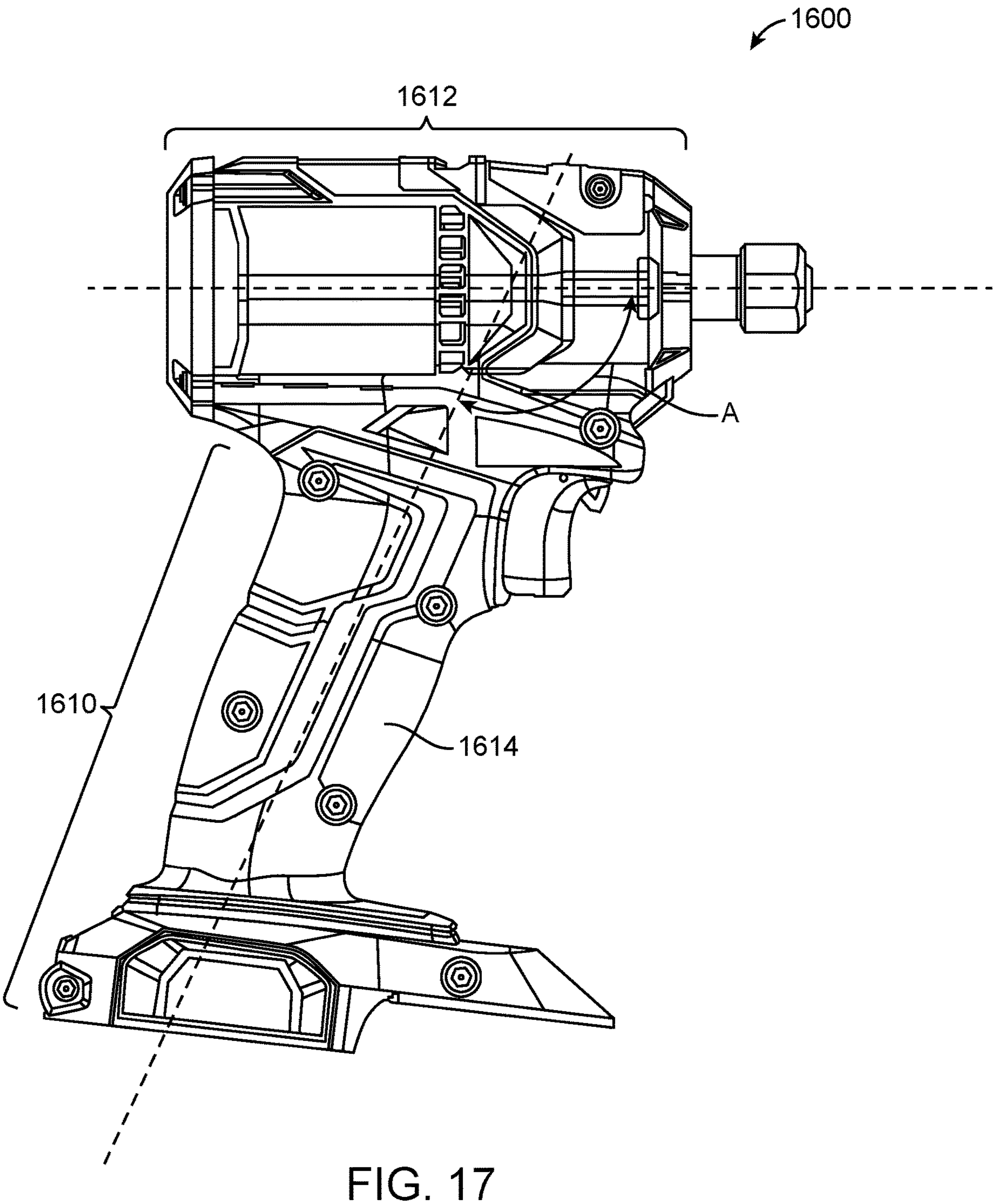
FIG. 17 is a side view of the die grinder of FIG. 16.
Figure 18:
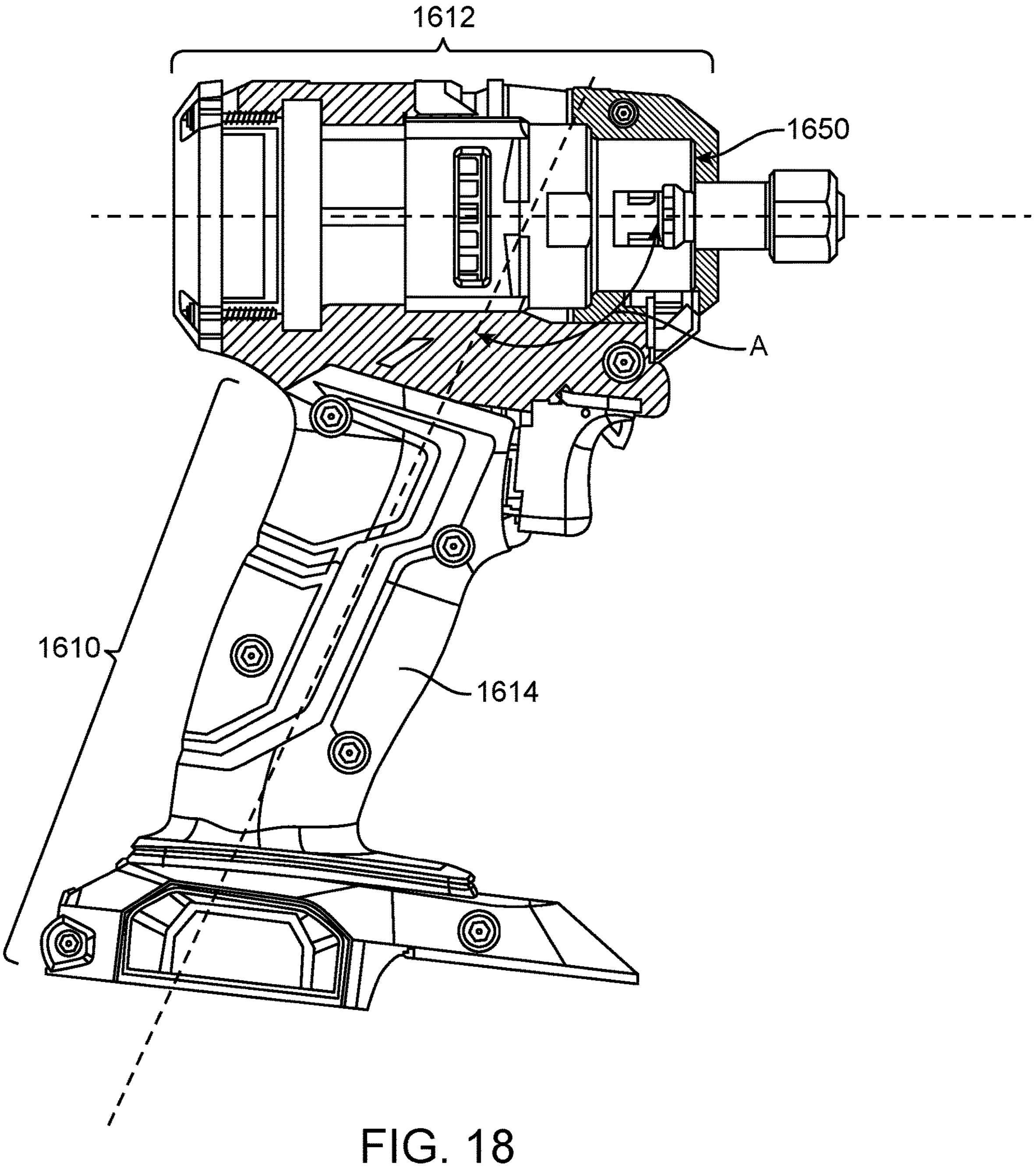
FIG. 18 is a side view of the die grinder of FIG. 16 with a portion of the housing removed.

FIGS. 16-18 illustrate another embodiment of a tool 1600 (e.g., a rotary die grinder, a drill, a hammer drill, a grinder, a saw, or some other tool with an electric motor). As illustrated, the tool 1600 includes a housing 1602 that has a first housing side 1604 and a second housing side 1606 that meet to form an interface 1608 between the housing sides 1604, 1606. It is to be understood that the housing sides 1604, 1606 are cooperating clamshell halves that are attached, or otherwise affixed, to each other via a plurality of fasteners 1609 (e.g., screws), via an adhesive, or a plastic welding operation.

As depicted in FIG. 16-18, the housing 1602 is hollow and includes a handle portion 1610 and a drive portion 1612 formed at an angle A thereto. The angle A is greater than or equal to ninety degrees)(90° (e.g., greater than or equal to ninety-five degrees (95°), greater than or equal to one hundred degrees (100°), greater than or equal to one hundred-five degrees (105°), greater than or equal to one hundred-ten degrees (110°), or greater than or equal to one hundred-fifteen degrees (115°)). Further, the angle A is less than or equal to one hundred-thirty (130°) (e.g., less than or equal to one hundred-twenty-five degrees (125°), or less than or equal to one hundred-twenty degrees (120°)). It is to be understood that the angle A may be within a range between, and including, the values of A described herein.

When the die grinder 1600 is assembled as indicated in FIGS. 16-18, the handle portion 1610 forms a grip 1614 that a user grasps while operating the die grinder 1600. FIG. 18 shows that the die grinder 1600 includes a drive assembly 1650 disposed within the drive portion 1612. The drive assembly 1650 is substantially identical to the drive assembly 1050 described in conjunction with the die grinder 1000 depicted in FIGS. 10-15. In another aspect, the drive assembly 1650 may be replaced with the drive assembly 150 of the die grinder 100 depicted in FIGS. 1-9.

Figure 19:
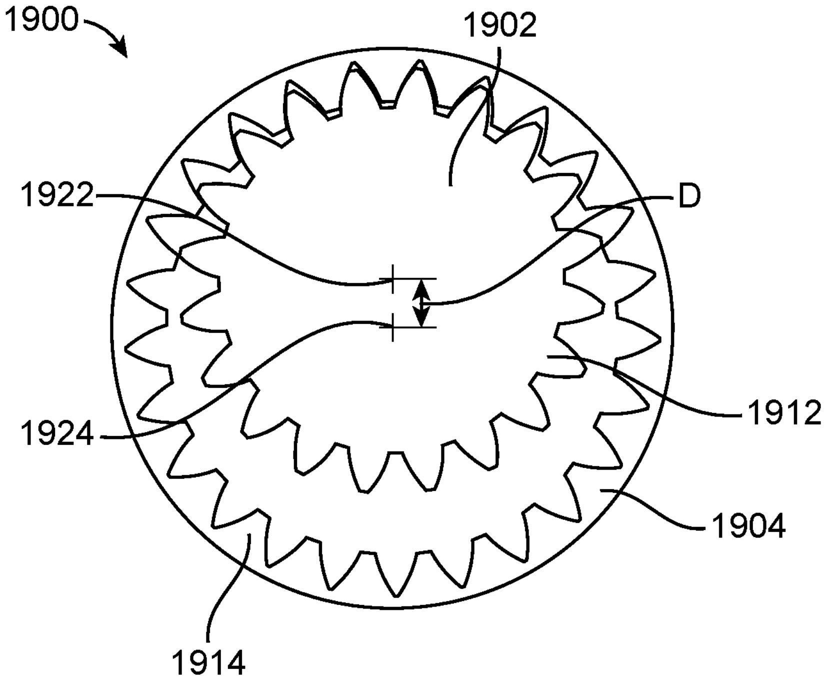
FIG. 19 is a cross-section view of an offset gear assembly according to an embodiment.
Figure 20:
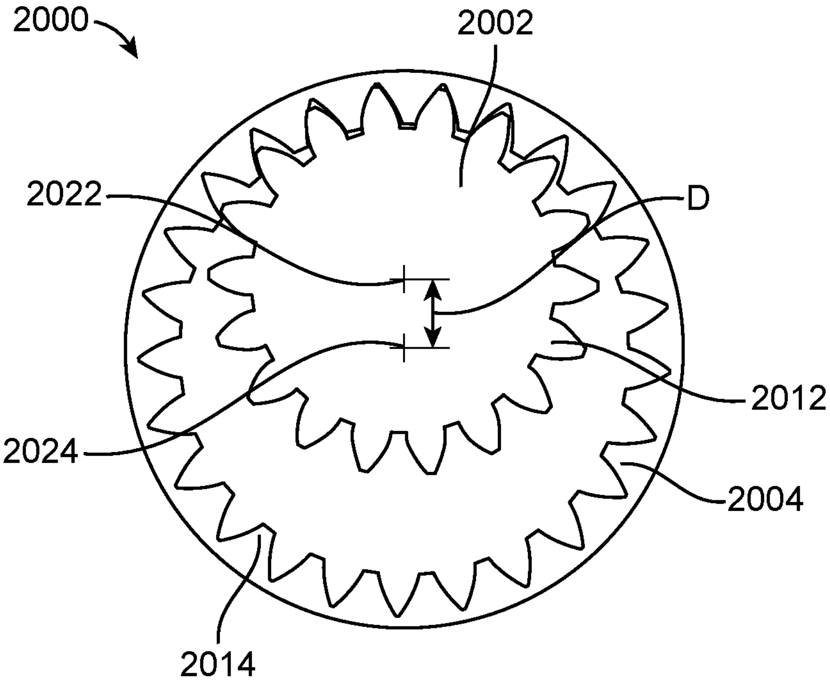
FIG. 20 is a cross-section view of an offset gear assembly according to another embodiment.

FIGS. 19-20 show exemplary offset gear assemblies 1900, 2000, 2002 that may be disposed within the gear boxes 156, 1056 of the drive assemblies 150, 1050 disclosed herein. Specifically, FIG. 19 illustrates an offset gear assembly 1900 that includes an inner gear 1902 and an outer gear 1904. As shown, the inner gear 1902 includes twenty (20) gear teeth 1912 and the outer gear 1904 includes twenty-five (25) gear teeth 1914. Accordingly, if the inner gear 1902 is designated at the input gear, the input-to-output gear ratio is 0.80 and an input speed of 22,000 RPM is reduced to 17,600 RPM. An input speed of 25,000 RPM is reduced to 20,000 RPM. On the other hand, if the outer gear 1904 is designated at the input gear, the input-to-output gear ratio is 1.25 an input speed of 22,000 RPM is increased to 27,500 RPM. An input speed of 25,000 RPM is increased to 31,250 RPM.

FIG. 20 depicts another exemplary offset gear assembly 2000 that includes an inner gear 2002 and an outer gear 2004. As illustrated, the inner gear 2002 includes eighteen (18) gear teeth 2012 and the outer gear 2004 includes twenty-five (25) gear teeth 2014. Accordingly, if the inner gear 2002 is designated at the input gear, the input-to-output gear ratio is 0.72 and an input speed of 22,000 RPM is reduced to 15,840 RPM. An input speed of 25,000 RPM is reduced to 18,000 RPM. On the other hand, if the outer gear 2004 is designated at the input gear, the input-to-output gear ratio is 1.39 an input speed of 22,000 RPM is increased to 30,580 RPM. An input speed of 25,000 RPM is increased to 34,750 RPM.

Figure 21:
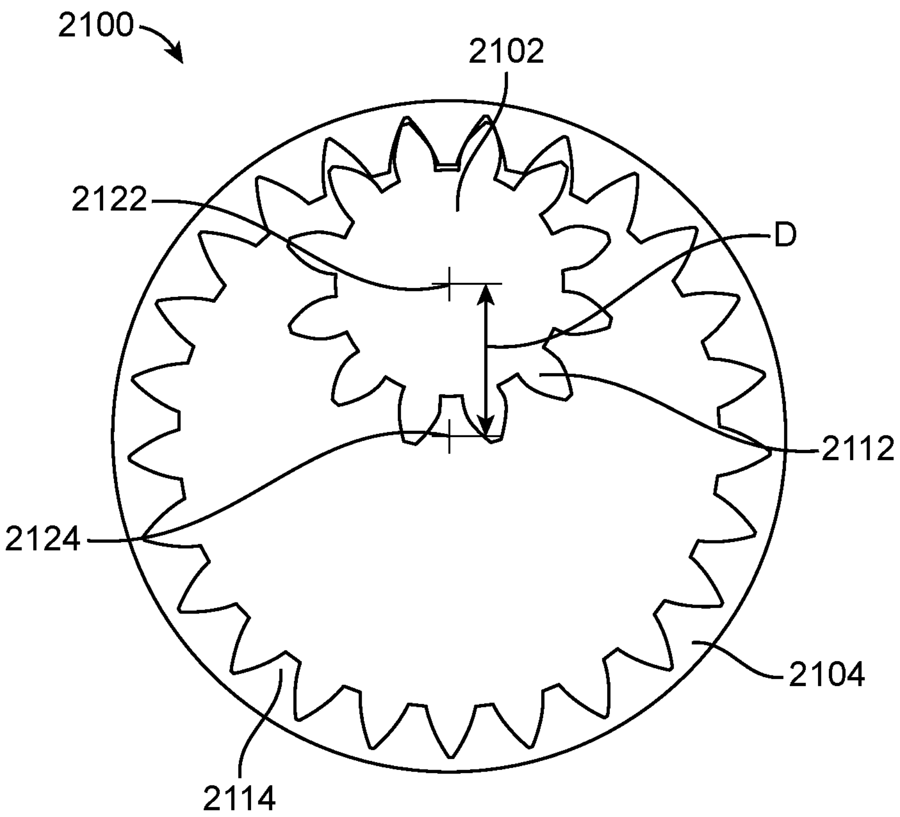
FIG. 21 is a cross-section view of an offset gear assembly according to still another embodiment.

FIG. 21 shows yet another exemplary offset gear assembly 2100 that includes an inner gear 2102 and an outer gear 2104. As depicted, the inner gear 2102 includes twelve (12) gear teeth 2112 and the outer gear 2104 includes twenty-five (25) gear teeth 2114. Accordingly, if the inner gear 2102 is designated at the input gear, the input-to-output gear ratio is 0.48 and an input speed of 22,000 RPM is reduced to 10,560 RPM. An input speed of 25,000 RPM is reduced to 12,000 RPM. On the other hand, if the outer gear 2104 is designated at the input gear, the input-to-output gear ratio is 2.08 an input speed of 22,000 RPM is increased to 45,760 RPM. An input speed of 25,000 RPM is increased to 52,000 RPM.

As shown in FIGS. 19-21, as the difference in gear teeth 1912, 1914, 2012, 2014, 2112, 2114 between the inner gear 1902, 2002, 2102 and the outer gear 1904, 2004, 2104 increases, the offset distance D between the center 1922, 2022, 2122 of the inner gear 1902, 2002, 2102 and the center 1924, 2024, 2124 of the outer gear 1904, 2004, 2104 increases. However, if the outer diameter of the outer gear 1904, 2004, 2104 is kept the same size, the overall size of the offset gear assembly 1900, 2000, 2100 does not change. As such, a near endless variety of gear ratios and output speeds can be achieved without changes in the overall size of the offset gear assembly 1900, 2000, 2100 and the tools in which the offset gear assemblies 1900, 2000, 2100 are installed.

The various gear teeth counts and gear ratios disclosed herein are intended to be exemplary to show the versatility of the offset gear assemblies 220, 1220, 1900, 2000, 2100 disclosed herein. These examples are not intended to limit the present disclosure.

Although the offset gear assemblies 220, 1220, 1900, 2000, 2100 are intended to be incorporated in rotary die grinders 100, 1000, 1600, the offset gear assemblies 220, 1220 may be used with other rotary power tools (e.g., drills, reciprocating saws, rotary hammers, pulse drivers, etc.) The offset gear assemblies 220, 1220, 1900, 2000, 2100 provide an efficient way to adjust the speed (up/down) or the torque (up/down) of a tool in small amounts. The compact form factor associated with the offset gear assemblies 220, 1220, 1900, 2000, 2100 disclosed herein are relatively compact and offer significant space savings within the tools in which the offset gear assemblies 220, 1220 are installed. The space savings can allow for a reduced diameter of the tool housing and a reduced axial length of the tool housing in which the offset gear assemblies 220, 1220 are installed. Further, the simplicity of the design of the offset gear assemblies 220, 1220 allow for a reduced part count when compared to other gearboxes that accomplish similar gear ratios. A reduced part count can provide significant cost saving associated with manufacturing a particular tool in which the offset gear assemblies 220, 1220 are installed. It is to be understood that the, offset distances, the gear tooth counts, and the gear ratios described herein are exemplary and any quantity of gear tooth counts and gear ratios may be provided. Further, as the gear ratio changes, the offset distance also changes.

Various features of the disclosure are set forth in the following claims.

The invention claimed is:

1. A tool comprising:
a housing;
a motor within the housing;
a gear box operably coupled to the motor, the gear box including
an input shaft rotatable about an input drive axis extending along a center of the motor; and
an output shaft rotatable about an output drive axis that is parallel to the input drive axis;
an input gear disposed on the input shaft; and
an output gear disposed on the output shaft,
wherein the input gear fits into the output gear, and
wherein the output drive axis is aligned with the input drive axis within a drive plane and offset from the input drive axis along the drive plane.

2. The tool of claim 1, wherein an outer periphery of the input gear is meshed with an inner periphery of the output gear.

3. The tool of claim 2, wherein a center of the input gear is spaced an offset distance D from a center of the output gear.

4. The tool of claim 1, wherein a center of the input gear is spaced an offset distance D from a center of the output gear.

5. A tool comprising:
a housing;
a motor disposed within the housing and rotatable about an axis;
a gear box operably coupled to the motor, the gear box including an offset gear assembly having
an input gear having an outer periphery; and
an output gear having an inner periphery,
wherein a center of the input gear is on the axis and is spaced an offset distance D from a center of the output gear, and
wherein the input gear is nested within the output gear and the outer periphery of the input gear is meshed with the inner periphery of the output gear.

6. The tool of claim 5, wherein the offset distance D is greater than or equal to approximately 1.5 millimeters.

7. The tool of claim 6, wherein the offset distance D is less than or equal to approximately 3.0 mm.

8. The tool of claim 5, wherein the offset gear assembly has an input-to-output gear ratio that is less than or equal to approximately 1.4.

9. The tool of claim 8, wherein the input-to-output gear ratio is greater than or equal to approximately 0.7.

10. A tool comprising:

a housing;

a motor within the housing;

a gear box operably coupled to the motor, the gear box including an offset gear assembly having an input shaft with an input gear disposed thereon, the input gear rotatable with the input shaft about an input drive axis; and an output shaft with an output gear disposed thereon, the output gear rotatable with the output shaft about an output drive axis;

wherein the output gear circumferentially surrounds the input gear and the output gear at least partially overlaps the input gear along a longitudinal axis such that the input gear is nested within the output gear and is meshed with the output gear, wherein the input drive axis and the output drive axis are separated from and parallel with each other, and the input drive axis and the output drive axis are aligned with a rotational axis of the motor, and wherein the input gear and the output gear rotate in the same direction.

11. The tool of claim 10, wherein the input gear includes a quantity of teeth NI greater than or equal to forty-eight (48).

12. The tool of claim 11, wherein the quantity of teeth NI is less than or equal to fifty-seven (57).

13. The tool of claim 10, wherein the output gear includes a quantity of teeth NO greater than or equal to fifty-eight (58).

14. The tool of claim 13, wherein the quantity of teeth NO is less than or equal to sixty-five (65).

15. The tool of claim 10, wherein the input gear and the output gear define an input-to-output gear ratio that is less than 1.0.

16. The tool of claim 15, wherein the input gear and the output gear define an input-to-output gear ratio that is greater than or equal to approximately 0.7.

17. The tool of claim 1, wherein the input gear and the output gear rotate in the same direction.

* * * * *